(12) United States Patent
Schneidewind

(10) Patent No.: US 8,172,022 B2
(45) Date of Patent: May 8, 2012

(54) ENERGY RECOVERY SYSTEMS FOR VEHICLES AND VEHICLE WHEELS COMPRISING THE SAME

(75) Inventor: Brian C. Schneidewind, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 373 days.

(21) Appl. No.: 12/627,209

(22) Filed: Nov. 30, 2009

(65) Prior Publication Data

US 2011/0127096 A1 Jun. 2, 2011

(51) Int. Cl.
*B60K 6/10* (2006.01)

(52) U.S. Cl. ....................................... 180/165; 475/189

(58) Field of Classification Search .................. 180/165, 180/2.2, 65.21, 65.51, 65.2; 475/189, 190, 475/191, 185; 301/6.1, 6.5, 95.101, 95.104; 303/152

See application file for complete search history.

(56) References Cited

U.S. PATENT DOCUMENTS

| | | | | |
|---|---|---|---|---|
| 1,691,625 | A | * | 11/1928 | Chilton .......................... 475/186 |
| 3,387,683 | A | * | 6/1968 | Budzich ........................ 180/165 |
| 4,282,947 | A | | 8/1981 | Kemper |
| 4,583,505 | A | | 4/1986 | Frank et al. |
| 4,591,016 | A | | 5/1986 | Matthews |
| 4,679,646 | A | | 7/1987 | Greenwood |
| 4,768,607 | A | | 9/1988 | Molina |
| 4,779,485 | A | * | 10/1988 | Dollison et al. ................ 74/661 |
| 4,815,570 | A | * | 3/1989 | Tsuchida et al. .......... 188/181 A |
| 5,085,088 | A | * | 2/1992 | Robinson et al. .................. 74/64 |
| 5,244,054 | A | * | 9/1993 | Parry ............................. 180/165 |
| 5,401,221 | A | | 3/1995 | Fellows et al. |
| 5,564,998 | A | | 10/1996 | Fellows |
| 5,591,281 | A | * | 1/1997 | Loewe .......................... 152/418 |
| 5,597,056 | A | * | 1/1997 | Blake ......................... 192/217.4 |
| 5,667,456 | A | * | 9/1997 | Fellows ......................... 476/42 |
| 5,925,993 | A | | 7/1999 | Lansberry |
| 5,931,249 | A | * | 8/1999 | Ellis et al. ..................... 180/165 |

(Continued)

FOREIGN PATENT DOCUMENTS

GB 2460237 A * 11/2009

(Continued)

OTHER PUBLICATIONS

Torotrak Toroidal Variable Drive CVT, xtrac.com.*

(Continued)

*Primary Examiner* — J. Allen Shriver, II
*Assistant Examiner* — Emma K Frick
(74) *Attorney, Agent, or Firm* — Dinsmore & Shohl LLP

(57) ABSTRACT

A wheel assembly for a vehicle includes a rim and an energy recovery system. The energy recovery system includes a flywheel, a continuously variable planetary (CVP), a first planetary gear set, and a second planetary gear set. The flywheel is substantially concentric with the rim and operable to rotate relative to the rim. The CVP is positioned within the flywheel and is operable to transmit rotational motion between the flywheel and the rim. The first planetary gear set is rotationally coupled to the rim and the CVP such that rotational motion transmitted between the CVP and the rim is transmitted through the first planetary gear set. The second planetary gear set is rotationally coupled to the CVP, the rim and the flywheel such that rotational motion transmitted between the CVP, the rim and the flywheel is transmitted through the second planetary gear set.

20 Claims, 6 Drawing Sheets

U.S. PATENT DOCUMENTS

| | | | |
|---|---|---|---|
| 6,009,365 A | 12/1999 | Takahara et al. | |
| 6,073,712 A * | 6/2000 | Buglione | 180/65.245 |
| 6,120,411 A * | 9/2000 | Booth, Jr. | 476/4 |
| 6,170,587 B1 | 1/2001 | Bullock | |
| 6,344,008 B1 | 2/2002 | Nagano et al. | |
| 6,506,139 B2 | 1/2003 | Hirt et al. | |
| 6,887,180 B2 | 5/2005 | Pels et al. | |
| 6,935,987 B1 * | 8/2005 | Booth, Jr. | 476/4 |
| 7,160,226 B2 | 1/2007 | Fuller | |
| 7,238,139 B2 | 7/2007 | Roethler et al. | |
| 7,293,621 B2 | 11/2007 | Long | |
| 7,416,039 B1 | 8/2008 | Anderson et al. | |
| 7,540,346 B2 | 6/2009 | Hu | |
| 7,624,830 B1 * | 12/2009 | Williams | 180/165 |
| 2006/0145482 A1 | 7/2006 | Roethler et al. | |
| 2006/0213703 A1 | 9/2006 | Long | |
| 2008/0081724 A1 | 4/2008 | Ivantysynova et al. | |
| 2009/0048054 A1 * | 2/2009 | Tsuchiya et al. | 475/216 |
| 2009/0062065 A1 | 3/2009 | Field et al. | |
| 2010/0184549 A1 * | 7/2010 | Sartre et al. | 475/5 |
| 2011/0100740 A1 * | 5/2011 | Schneidewind | 180/165 |
| 2011/0204650 A1 * | 8/2011 | Dunne | |
| 2011/0256972 A1 * | 10/2011 | Greenwood | 475/1 |

FOREIGN PATENT DOCUMENTS

| | | | |
|---|---|---|---|
| GB | 2466237 A * | 6/2010 | |
| GB | 2476676 * | 7/2011 | |

OTHER PUBLICATIONS

Office Action mailed Jan. 12, 2012 as it relates to U.S. Appl. No. 12/612,246.

* cited by examiner

ENERGY RECOVERY SYSTEMS FOR VEHICLES AND VEHICLE WHEELS COMPRISING THE SAME

CROSS REFERENCE TO RELATED APPLICATIONS

This specification is related to commonly assigned U.S. patent application Ser. No. 12/612,246 filed Nov. 4, 2009 entitled "ENERGY RECOVERY SYSTEMS FOR VEHICLES AND WHEELS COMPRISING THE SAME".

TECHNICAL FIELD

The present specification generally relates to systems for recovering the kinetic energy of a vehicle and, more specifically, to energy recovery systems comprising a flywheel coupled to a source of rotational motion with a continuously variable planetary gear and vehicles and wheels for vehicles comprising the same.

BACKGROUND

Wheeled vehicles such as automobiles, trucks, motorcycles, trains, bicycles and the like have a considerable amount of kinetic energy when the vehicle is in motion. For example, the mass of the vehicle may generate a considerable amount of mechanical kinetic energy as the vehicle is propelled forward with an engine, electric motor or even human power. However, during braking, the excess kinetic energy of the vehicle is primarily dissipated as heat emitted from the braking system. Because the kinetic energy of the vehicle is dissipated instead of being recaptured and stored, the overall energy efficiency of the vehicle is low.

Various systems have been developed to recapture the kinetic energy of a vehicle as the vehicle decelerates. For example, some gas/electric hybrid automobiles incorporate electrical regenerative braking systems which capture the kinetic energy of the automobile (e.g., the rotation of the wheels) during deceleration and convert the kinetic energy to electrical energy which is stored in a battery as electrical potential energy. The conversion of the mechanical kinetic energy to electrical potential energy also assists in decelerating or braking the vehicle. While regenerative braking systems may improve the overall energy efficiency of the vehicle by capturing and converting some of the vehicle's mechanical kinetic energy to electrical potential energy, the process of converting the mechanical kinetic energy to electrical potential energy is relatively inefficient.

Accordingly, a need exists for alternative systems for recovering and storing the kinetic energy of a vehicle as mechanical potential energy and returning the mechanical potential energy to the drive train of the vehicle to assist in vehicle propulsion.

SUMMARY

In one embodiment, a wheel assembly for a vehicle includes a rim and an energy recovery system. The energy recovery system may include a flywheel, a continuously variable planetary (CVP), a first planetary gear set, and a second planetary gear set. The flywheel may be substantially concentric with the rim and operable to rotate relative to the rim. The CVP may be positioned within the flywheel and operable to transmit rotational motion between the flywheel and the rim. The first planetary gear set may be disposed in the flywheel and rotationally coupled to the rim and the CVP such that rotational motion transmitted between the CVP and the rim is transmitted through the first planetary gear set. The second planetary gear set may be disposed in the flywheel and rotationally coupled to the CVP, the rim and the flywheel such that rotational motion transmitted between the CVP, the rim and the flywheel is transmitted through the second planetary gear set. When the magnitude of the angular velocity of the rim is greater than the magnitude of the angular velocity of the flywheel, kinetic energy from the rim is imparted to the flywheel and stored as mechanical potential energy. When the magnitude of the angular velocity of the rim is less than the magnitude of the angular velocity of the flywheel, mechanical potential energy stored in the flywheel is imparted to the rim thereby accelerating the rim.

In another embodiment, an energy recovery system includes a flywheel, a continuously variable planetary (CVP), a first planetary gear set, a second planetary gear set, and an input/output coupling configured for connection to a source of rotational motion. The first planetary gear set rotationally couples the CVP to the input/output coupling. The second planetary gear set rotationally couples the CVP to the flywheel and the input/output coupling to the flywheel. The CVP may be operable to transmit rotational motion between the flywheel and the input/output coupling. The CVP may include an idler ring, a plurality of roller elements, an input ring and an output ring. The idler ring is concentric with the flywheel and operable to rotate about an axis of rotation of the wheel assembly. The plurality of roller elements may be pivotally positioned on the idler ring and operable to roll on the idler ring. The idler ring may be axially displaceable with respect to the roller elements such that the tilt angle between the roller elements and the idler ring is adjustable. The input ring may be frictionally engaged with the roller elements and rotationally coupled to the first planetary gear set such that the input ring is operable to transmit rotational motion between the first planetary gear set and the roller elements. The output ring is frictionally engaged with the roller elements and rotationally coupled to the second planetary gear set such that the output ring is operable to transmit rotational motion between the second planetary gear set and the roller elements.

A vehicle having a wheel with an energy recovery system as described herein may be controlled by determining an amount of braking force applied to the brake system of the vehicle and determining an amount of acceleration force applied of the vehicle. Thereafter, the tilt angle of the roller elements of the CVP on the idler ring of the CVP may be adjusted in proportion to the amount of braking force or the acceleration force of the vehicle such that rotational energy is exchanged between the flywheel and the wheel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
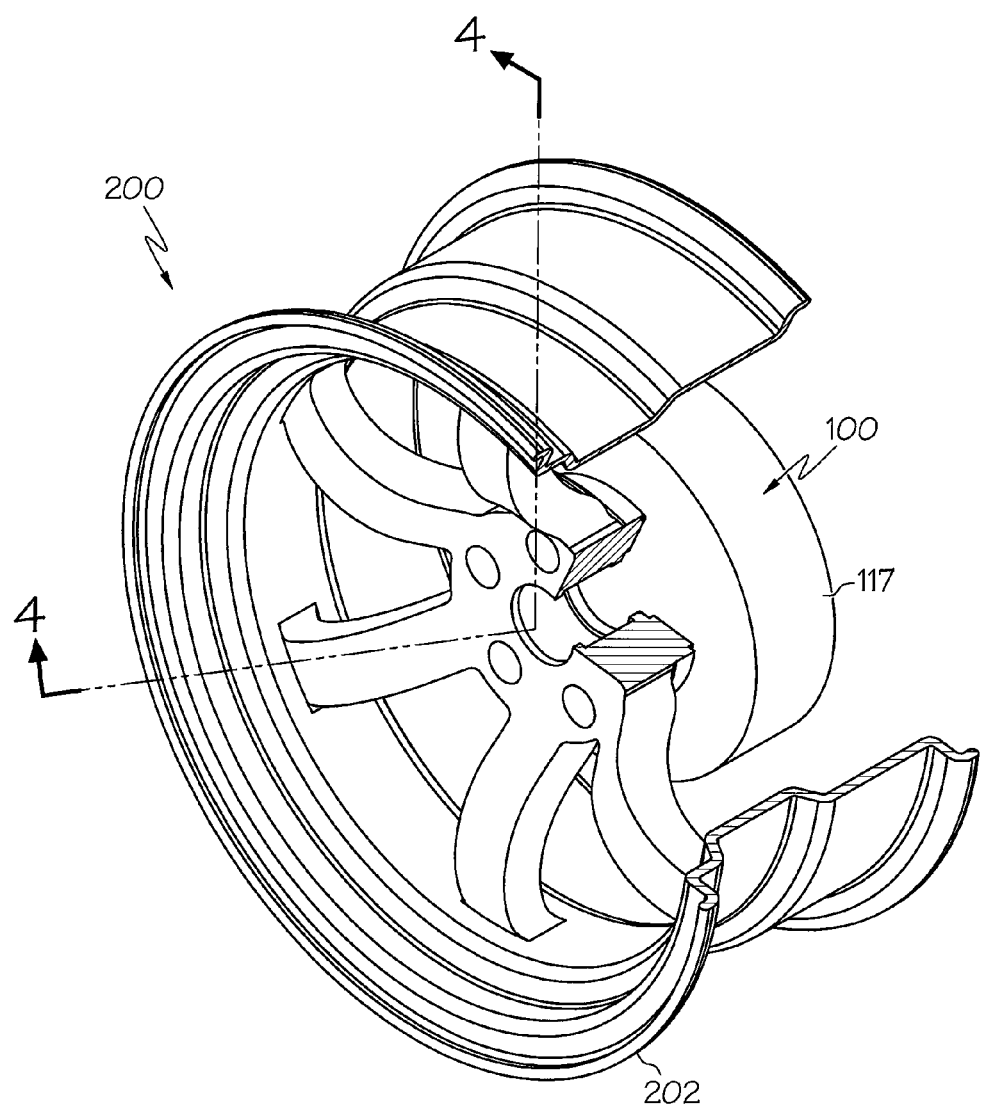
FIG. 1 depicts a wheel with an energy recovery system according to at least one embodiment shown and described herein.

FIG. 1 depicts a wheel assembly for a vehicle which comprises an energy recovery system according to one embodiment described herein. The energy recovery system may generally comprise a flywheel rotationally coupled to a source of rotational motion with a continuously variable planetary and at least two planetary gear sets. Depending on the relative angular velocities of the flywheel and the source of rotational motion, the energy recovery system may be operable to either impart the rotational motion of the source to the flywheel (i.e., store the mechanical kinetic energy of the source as mechanical potential energy) or impart the rotational motion of the flywheel to the source (i.e., utilize the stored mechanical potential energy to do useful work on the source). Various embodiments of energy recovery systems and wheels and vehicles utilizing the energy recovery systems will be described in more detail herein.

Referring to FIG. 1, a wheel assembly 200 for use in conjunction with a vehicle is illustrated. The wheel assembly 200 generally comprises a wheel rim 202 which is rotationally coupled to an energy recovery system 100. In the embodiment shown in FIG. 1, the energy recovery system 100 is at least partially disposed within the wheel assembly and is substantially coaxial with the axis of rotation of the rim. The energy recovery system 100 will be described in more detail with reference to FIG. 2.

Figure 2:
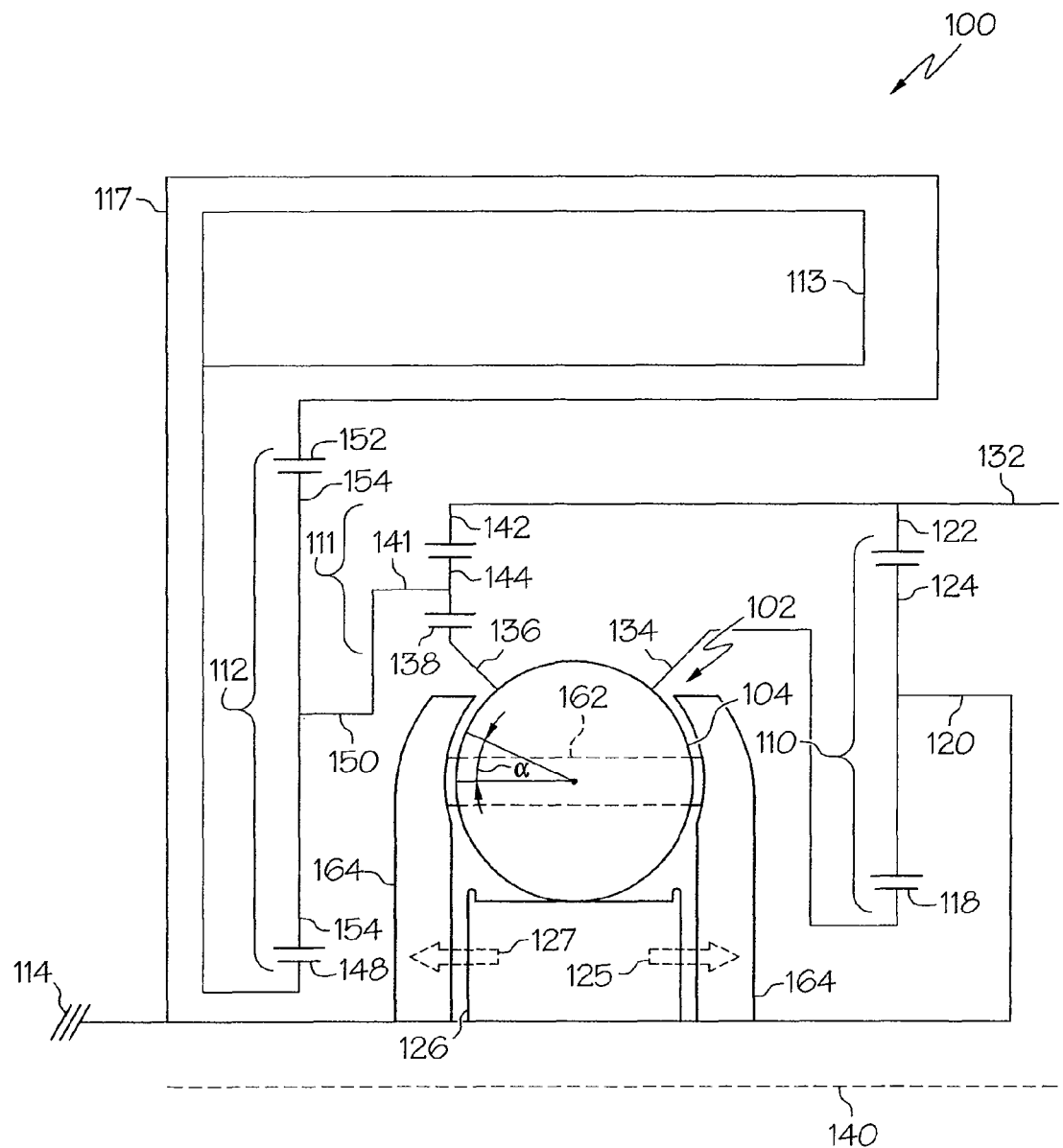
FIG. 2 is a schematic diagram of a partial cross section of an energy recovery system according to one or more embodiments shown and described herein.

Referring now to FIG. 2, a schematic of a partial radial cross section of the energy recovery system 100 is depicted relative to the axis of rotation 140 of the energy recovery system. The energy recovery system 100 may generally comprise a housing 117 in which a ball-type continuously variable planetary (CVP) 102 and a flywheel 113 are positioned. The CVP 102 and flywheel 113 are rotationally coupled to one another, as will be described in more detail herein. The housing may be filled with a fluid, such as a transmission fluid, which lubricates the rotating parts of the energy recovery system 100 and also facilitates mechanically coupling the rotating parts of the energy recovery system. In the embodiments of the energy recovery system 100 shown and described herein, the CVP is positioned within the inner diameter of the flywheel such that the CVP and the flywheel have a common axis of rotation 140. The positioning of the CVP within the flywheel reduces the overall footprint of the energy recovery system and is facilitated by the use of the CVP.

Still referring to FIG. 2, the flywheel 113 is generally cylindrical in shape. The axis of rotation 140 of the flywheel is generally coaxial with the long axis of the cylinder such that the mass of the flywheel is balanced about the axis of rotation 140. The flywheel may generally comprise a metallic material, such as a steel alloy or the like. However, it should be understood that the flywheel may be constructed of other materials including, without limitation, metals, ceramics, polymers, composite materials and/or combinations thereof. In one embodiment the flywheel may be encased in carbon fiber.

One end of the flywheel 113 comprises a plate or web of material (not shown) which extends across the end of the flywheel in a radial direction. The plate or web provides a mounting structure for a sun gear 148 (described in more detail herein) which is affixed to the plate or web such that the axis of rotation of the sun gear is coaxial with the axis of rotation of the flywheel. Rotation of the flywheel 113 about the axis of rotation 140 is facilitated by one or more bearings (not shown) disposed between the third sun gear 148 and the axis of rotation 140 of the flywheel.

The CVP 102 is rotationally coupled to the flywheel 113 such that rotational motion imparted to the CVP is transmitted to the third sun gear 148 which, in turn, causes the rotation of the flywheel 113 about the axis of rotation 140. The CVP 102 is coupled to the flywheel 113 and to an input/output coupling 172 by at least two planetary gear sets, as will be described in more detail herein.

Still referring to FIG. 2, the CVP 102 generally comprises a plurality of roller elements 104, an idler ring 126, an input ring 134 and an output ring 136. The idler ring 126 is substantially cylindrical and acts as a raceway on which each roller elements are supported and rolled. The idler ring 126 is centered in the energy recovery system 100 on the axis of rotation 140 such that the idler ring is operable to rotate about the axis of rotation. A plurality of roller elements 104 are arrayed around the idler ring such that each roller element is in rolling contact with the idler ring. While single roller element 104 is depicted in the cross section of the energy recover system shown in FIG. 2 it should be understood that the CVP comprises a plurality of roller elements. Each roller element 104 generally has a curved outer surface. For example, as shown in FIG. 2, the roller element 104 is substantially spherical. However, it should be understood that the roller element 104 may have other shapes including, without limitation, spheroidal shapes and the like. Each roller element 104 is positioned on a shaft or axle 162 which is pivotally coupled to a pair of support arms 164 which allow the axle 162 and the roller element 104 to be pivoted relative to the idler ring 126 thereby changing the tilt angle α of the roller element on the idler ring with respect to the axis of rotation of the roller element. Each roller element 104 is operable to rotate about a corresponding axle 162 which is supported by support arms 164. As rotational motion is imparted to the roller element 104, as will be described in more detail herein, the roller element rolls on the idler ring 126. The rolling contact between the roller element and the idler ring causes the idler ring to rotate about the axis of rotation 140 while the roller elements are held in a fixed position by the support arms as the roller elements rotate about their respective axles.

The input ring 134 is positioned within the flywheel 113 and is concentric with the axis of rotation 140 such that the input ring 134 is operable to rotate about the axis of rotation. The input ring 134 is frictionally engaged with each roller element 104 such that, as the input ring 134 is rotated about the axis of rotation 140, the rotation of the input ring 134 is imparted to the roller elements 104 thereby rotating or rolling the roller elements on their respective axles 162.

The output ring 136 is positioned within and concentric with the flywheel 113 such that the output ring 136 is operable to rotate about the axis of rotation 140 of the energy recovery system 100. The output ring is frictionally engaged with each roller element 104 of the CVP 102 such that, as the roller elements roll on the idler ring 126, the rotational motion of the roller elements is imparted to the output ring thereby rotating the output ring about the axis of rotation 140.

As described herein, each roller element 104 may be pivoted on the idler ring 126 thereby changing the angular orientation of the axle 162 with respect to the idler ring. The roller elements may be pivoted by displacing the idler ring 126 axially (i.e., in a direction along the axis of rotation 140 as indicated by arrows 125 and 127). For example, the idler ring 126 may be mechanically coupled to an actuator (not shown) such as a mechanical actuator, an electro-mechanical actuator or a hydraulic actuator, which displaces the idler ring 126 in an axial direction. Because each roller element is in contact with the idler ring 126 but constrained by the support arms 164, when the idler ring 126 is displaced in the axial direction, the angular orientation of each roller element is tilted with respect to the idler ring which, in turn, tilts the axle 162 of each roller element 104 with respect to the idler ring 126.

As the idler ring 126 is displaced in the axial direction and the roller elements 104 are tilted with respect to the idler ring 126, the relative angular velocities of the input ring 134 and the output ring 136 are also adjusted. For example, when the contact angle $\alpha$ is zero degrees, the angular velocities of the input ring 134 and the output ring 136 are the same. However, as the contact angle $\alpha$ increases from zero, the magnitude of the angular velocity of the output ring 136 increases relative to the magnitude of the angular velocity of the input ring 134 due to the change in the orientation of the roller element 104 on the idler ring. Accordingly, it should be understood that, by adjusting the angular orientation of the roller elements 104 on the idler ring 126 the angular velocity of the output ring 136 may be adjusted with respect to the angular velocity of the input ring 134.

In order to facilitate rolling the roller elements 104 on the idler ring 126, the CVP 102 is rotationally coupled to a source of rotational motion with input/output coupling 132 and a first planetary gear set 110. The input/output coupling 132 is generally a hollow cylinder disposed within and concentric with the flywheel 113. The input/output coupling is coupled or attached to a source of rotational motion which causes the input/output coupling 132 to rotate about the axis of rotation 140 of the energy recovery system 100.

The input/output coupling 132 is rotationally coupled to a conventional planetary gear set such as the first planetary gear set 110. The first planetary gear set 110 comprises a first ring gear 122, a first carrier 120, a plurality of pinion gears 124 and a first sun gear 118. The first ring gear 122 is fixedly attached to the input/output coupling 132 and concentric with the input/output coupling 132 and flywheel 113. The first carrier 120 is concentric with the first ring gear. The first carrier 120 is fixedly attached to the housing of the energy recovery system 100 and/or to a chassis 114 in which the energy recovery system is disposed, as shown in FIG. 2. The first sun gear 118 may be concentric with the first carrier 120 and operable to rotate relative to the first ring gear and the first carrier. The pinion gears 124 of the first planetary gear set are rotationally coupled to the first carrier 120 and engaged with the first ring gear 122 and the first sun gear 118 such that, as the input/output coupling 132 and first ring gear 122 are rotated about the axis of rotation 140, the pinion gears 124 of the first planetary gear set 110 mesh with the first ring gear 122 and the first sun gear 118 thereby imparting the rotational motion of the first ring gear 122 to the first sun gear 118 and rotating the first sun gear about the axis of rotation 140.

Still referring to FIG. 2, the first sun gear 118 is fixedly attached to the input ring 134 which is frictionally engaged with each roller element 104 of the CVP 102, as described above. Rotation of the first sun gear 118 about the axis of rotation 140 rotates the input ring 134 about the axis of rotation 140. As the input ring 134 rotates, the input ring frictionally engages each roller element 104 of the CVP 102 causing the roller elements to roll on the idler ring 126 which, in turn, rotates the output ring 136 of the CVP.

The output ring 136 of the CVP 102 is rotationally coupled to the flywheel 113 with at least one planetary gear set. For example, in the embodiment shown in FIG. 2, the output ring 136 is rotationally coupled to the flywheel 113 with second planetary gear set 111. The second planetary gear set 111 comprises a second ring gear 142, a second carrier 141, a plurality of pinion gears 144 and a second sun gear 138. The second ring gear 142 is fixedly attached to the input/output coupling 132 and concentric with the input/output coupling 132 and flywheel 113. The second carrier 141 is concentric with the second ring gear 142 and operable to rotate relative to the second ring gear. The second sun gear 138 may be concentric with the second carrier 141 and operable to rotate relative to the second ring gear and the second carrier. The pinion gears 144 are rotationally coupled to the second carrier 141 and engaged with the second ring gear 142 and the second sun gear 138 such that, as the second sun gear 138 rotates about the axis of rotation 140, the second sun gear 138 meshes with the pinion gears 144 of the second planetary gear set 111 which, in turn, mesh with the second ring gear 142 thereby rotating the second carrier 141 about the axis of rotation 140. The second sun gear 138 is fixedly attached to the output ring 136 of the CVP 102 such that the second sun gear 138 is operable to rotate with the output ring 136.

The second planetary gear set 111 is also rotationally coupled to the input/output coupling 132, as shown in FIG. 2. More specifically, the second ring gear 142 is fixedly attached to the input/output coupling 132 and concentric with the input/output coupling 132 and flywheel 113 such that, as the input/output coupling is rotated about the axis of rotation 140, the second ring gear 142 is also rotated about the axis of rotation. In turn, the second ring gear 142 meshes with the pinion gears 144 which mesh with the second sun gear 138 thereby rotating the second sun gear 138 and the second carrier 141.

Referring to the second planetary gear set 111, it should be noted that none of the second ring gear 142, the second carrier 141 or the second sun gear 138 are fixed with respect to one another. Further, because the second planetary gear set 111 is rotationally coupled to both the CVP 102 and the input/output coupling 132, and because none of the components of the second planetary gear set 111 are fixed with respect to the others, the second planetary gear set 111 blends the angular velocity of the output ring 136 with the angular velocity of the input/output coupling 132 such that the second carrier 141 is rotated at an angular velocity which is the resultant of the angular velocity of the output ring 136 and the angular velocity of the input/output coupling 132. Accordingly, when the angular velocity of the second sun gear 138 (which is coupled to the output ring 136) is greater than the angular velocity of the second ring gear 142 (which is coupled to the input/output coupling 132) the second carrier 141 is rotated at an angular velocity which is dependent on the difference between the angular velocity of the second sun gear 138 and the angular velocity of the second ring gear 142. Similarly, when the angular velocity of the second ring gear 142 is greater than the angular velocity of the second sun gear 138, the second carrier 141 is rotated at an angular velocity which is based on the difference between the angular velocity of the second ring gear 142 and the angular velocity of the second sun gear 138.

In one embodiment (not shown), the second carrier 141 of the second planetary gear set 111 may be directly coupled to the flywheel 113 such that, as the second carrier 141 rotates about the axis of rotation 140, the rotation of the second carrier is directly imparted to the flywheel 113 thereby rotating the flywheel about the axis of rotation 140. However, in the embodiment shown in FIG. 2, the second carrier 141 of the second planetary gear set 111 is rotationally coupled to the flywheel 113 with a third planetary gear set 112, as will be described in further detail herein.

Still referring to FIG. 2, the third planetary gear set 112 generally comprises a third ring gear 152, a plurality of pinion gears 154, a third carrier 150 and a third sun gear 148. The third ring gear 152 is fixedly attached or grounded to the housing 117 of the energy recovery system 100 which, in turn, may be fixedly attached or grounded to a chassis 114 in which the energy recovery system is installed. The third ring gear 152 is positioned within and concentric with the flywheel 113. The third carrier 150 is concentric with the third ring gear and operable to rotate relative to the third ring gear about the axis of rotation 140. The third sun gear 148 is concentric with the third carrier 150 and operable to rotate relative to the third ring gear and the third carrier about the axis of rotation 140. The pinion gears 154 are rotationally coupled to the third carrier 150 and engaged with the third ring gear 152 and the third sun gear 148 such that, as the third carrier 150 is rotated relative to the third ring gear 152, the pinion gears 154 mesh with the third ring rear 152 and the third sun gear 148 thereby imparting the rotational motion of the third carrier 150 to the third sun gear 148.

The third carrier 150 of the third planetary gear set 112 is rotationally coupled to the second carrier 141 of the second planetary gear set 111 such that rotation of the second carrier 141 rotates the third carrier 150 which, in turn, meshes the pinion gears 154 of the third planetary gear set 112 with the third ring gear 152 and the third sun gear 148 thereby rotating the third sun gear. The third sun gear 148 is fixedly attached to the flywheel 113. Accordingly, it should be understood that rotation of the third sun gear 148 also causes the rotation of the flywheel 113 thereby storing the rotational motion introduced into the energy recovery system 100 at the input/output coupling 132 as mechanical potential energy in the flywheel 113. The use of the third planetary gear set 112 to couple the input/output coupling 132 to the flywheel introduces a gear reduction between the source of rotational motion introduced at the output ring 136 and the third sun gear 148 rotationally coupled to the flywheel 113. This gear reduction causes the third sun gear 148 (and therefore the flywheel 113) to spin faster than the source of rotational motion coupled to the input/output coupling 132 which, in turn, improves the overall effectiveness of the energy recovery system 100.

Figure 5:
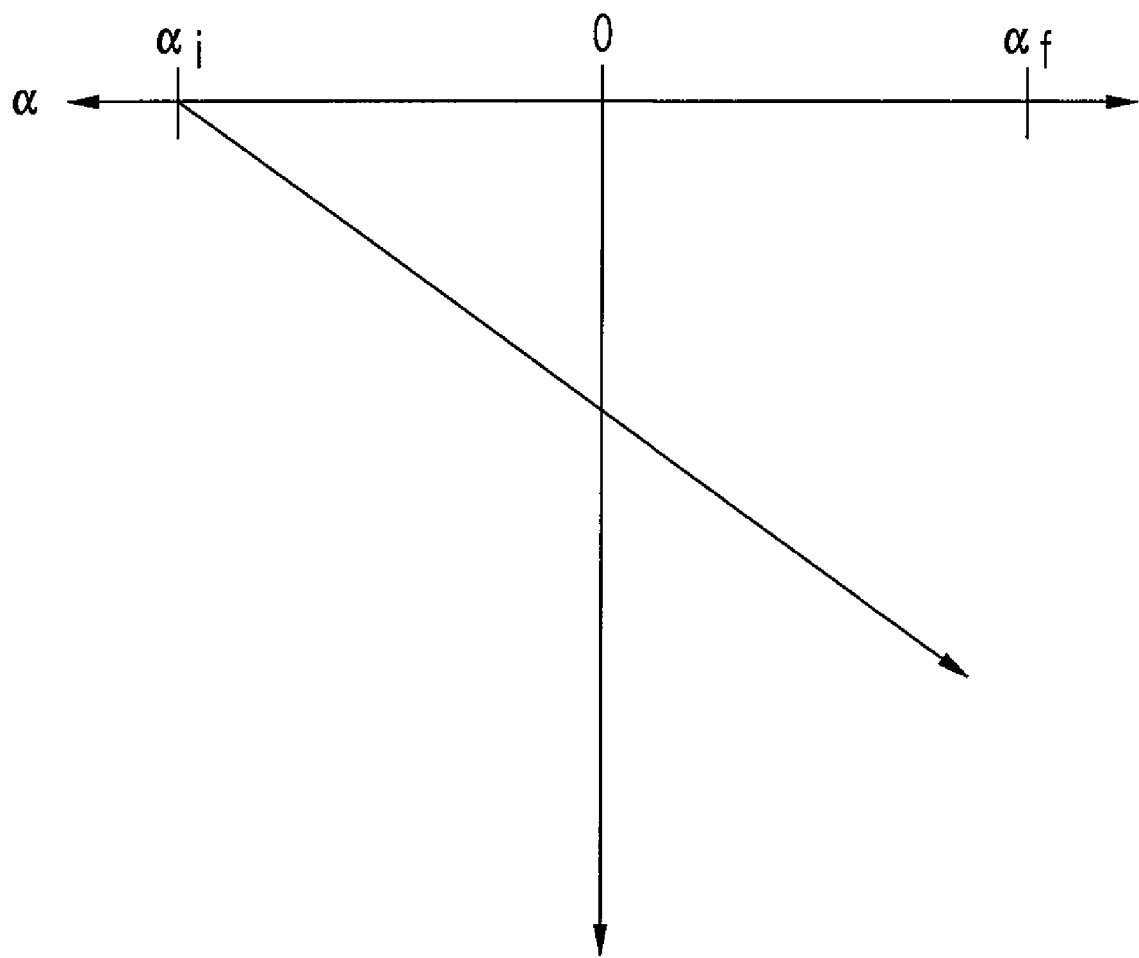
FIG. 5 is a graphic representation of the relationship between the angular orientation of the infinitely variable planetary of the energy recovery system and the angular velocity of the flywheel.

Referring now to FIGS. 2 and 5, the idler ring 126 may be displaced relative to each roller element 104 which, in turn, adjusts the angular orientation of each roller element 104 with respect to the output ring 136 and the input ring 134. When the tilt angle α of each roller element 104 of the CVP 102 is at an initial angle $α_i$, (which in the embodiments described herein is less than 0 degrees), no rotational motion is exchanged between the flywheel 113 and the input/output coupling 132. When the roller elements of the CVP are in this position the energy recovery system 100 is essentially in neutral.

However, as the angle α is increased from $α_i$ to $α_f$, rotational motion may be exchanged between the flywheel 113 and the wheel assembly 200 depending on the relative magnitudes of the angular velocities of each. For example, FIG. 5 depicts the relationship between the tilt angle α and the angular velocity of the flywheel 113 when the magnitude of the angular velocity of the wheel is greater than the magnitude of the angular velocity of the flywheel 113. As the tilt angle α increases from $α_i$ to $α_f$, the magnitude of the angular velocity increases as rotational motion of the wheel assembly 200 is imparted to the flywheel 113. This increase in magnitude is shown as being negative in FIG. 5 as the wheel assembly 200 and flywheel 113 are rotating in opposite directions. While FIG. 5 shows the relationship between the tilt angle α and the magnitude of the angular velocity of the flywheel 113 when the magnitude of the angular velocity of the flywheel 113 is less than the magnitude of the angular velocity of the wheel assembly 200, it should be understood that there is a similar relationship between the magnitude of the angular velocity of the wheel assembly and the tilt angle α when the magnitude of the angular velocity of the wheel assembly is less than the magnitude of the angular velocity of the flywheel.

Figure 3:
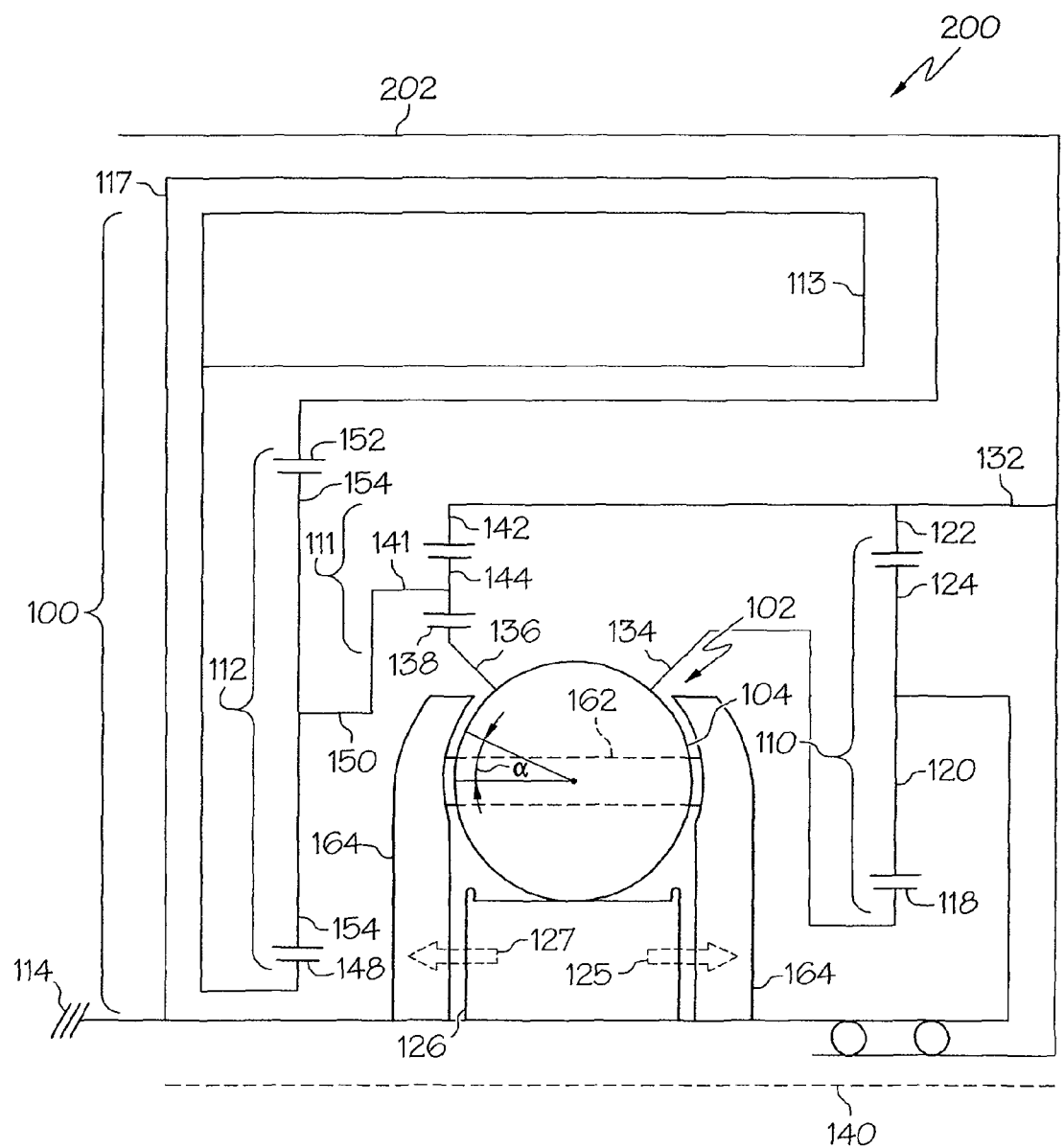
FIG. 3 depicts a schematic diagram of a partial cross section of the energy recovery system of FIG. 2 positioned within and rotationally coupled to a vehicle wheel.
Figure 4:
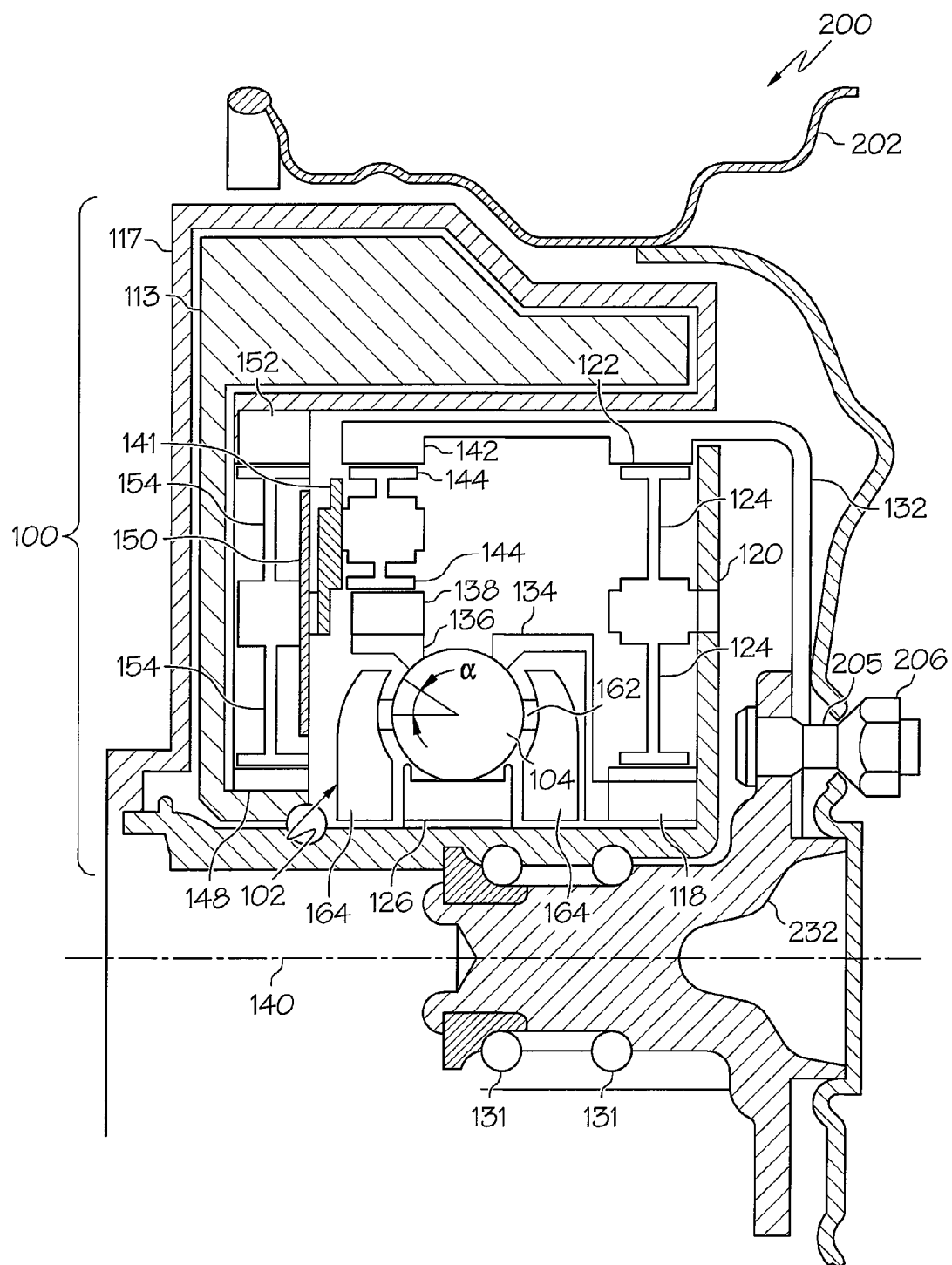
FIG. 4 depicts a partial radial cross section of a vehicle wheel comprising an energy recovery system according to one or more embodiments shown and described herein.

Reference will now be made to FIGS. 1, 3 and 4 to describe the energy recovery system 100 in use. As shown in FIG. 1, the energy recovery system 100 may be rotationally coupled to a wheel, such as the wheel assembly 200 shown in FIG. 1. The energy recovery system 100 may be positioned within the wheel assembly 200 such that the wheel and energy recovery system 100 are operable to rotate about a common axis of rotation 140. As shown in FIGS. 3 and 4, the input/output coupling 132 of the energy recovery system is fixedly attached to the wheel rim 202 of the wheel assembly 200. Specifically, the input/output coupling of the energy recovery system 100 is fixedly attached to the wheel hub 232 of the wheel rim 202 with conventional connectors such as, for example, a lug 205 and corresponding lug nut 206. A plurality of bearings 131 may be disposed between the energy recovery system 100 and the wheel hub such that the energy recovery system 100 and the wheel rim 202 rotate relative to one another.

As the wheel rim 202 rotates, the rotational motion of the wheel rim 202 is imparted to the energy recovery system 100 via the interconnection between the wheel hub 232 and the input/output coupling 132 of the energy recovery system 100. For purposes of illustration and example, it will be assumed that the wheel is rotating in a clockwise direction and that the magnitude of the angular velocity of the wheel assembly 200 is greater than the magnitude of the angular velocity of the flywheel 113 such that the kinetic energy of the wheel rim 202 is being stored in the flywheel 113 as mechanical potential energy. Accordingly, in this embodiment, the contact angle α between the roller elements 104 and the idler ring 126 is greater than $α_i$ such that the energy recovery system 100 is operable to receive rotational energy from the wheel rim 202 and/or discharge rotational energy to the wheel rim 202.

Clockwise rotation of the wheel assembly 200 causes the input/output coupling 132, the first ring gear 122 and the second ring gear 142 to also rotate in a clockwise direction. The first ring gear 122 rotates the pinion gears 124 of the first planetary gear set 110 on the fixed first carrier 120 in a clockwise direction, which, in turn, rotates the first sun gear 118 and the input ring 134 in a counter clockwise direction.

The input ring 134 is frictionally engaged with the roller elements 104 of the CVP 102 such that, as the input ring 134 rotates in a counter clockwise direction, the roller elements 104 are also rotated in a counter clockwise direction on the idler ring 126. The rotation of the roller elements 104 is, in turn, imparted to the output ring 136 with which the roller elements 104 are frictionally engaged causing the output ring 136 to rotate in a counter clockwise direction about the axis of rotation 140. The output ring 136, in turn, rotates the second sun gear 138 of the second planetary gear set 111 in a counter clockwise direction.

The magnitude of the angular velocity of the second sun gear 138 is generally greater than the magnitude of the angular velocity of the input/output coupling 132 and the angular velocity of the second carrier 141 is the resultant of the angular velocity of the second sun gear 138 and the angular velocity of the input/output coupling 132. Accordingly, the second sun gear 138 meshes with the pinion gears 144 of the second planetary gear set 111 causing the pinion gears 144 to rotate in a clockwise direction and the second carrier 141 to rotate in a counter clockwise direction.

In the embodiment shown in FIGS. 3 and 4 the second carrier 141 is rotationally coupled to the third carrier 150 of the third planetary gear set 112 such that the third carrier 150 rotates with the second carrier 141 in a counter clockwise direction. The rotation of the third carrier 150 causes the pinion gears 154 of the third planetary gear set 112 to mesh with the third ring gear 152 (which is fixed to the housing 117 and chassis 114) and the third sun gear 148 such that the third sun gear 148 rotates in a counter clockwise direction. As the third sun gear 148 rotates in a clockwise direction, the flywheel 113 is also rotated in a counter clockwise direction such that the rotational motion (i.e., the mechanical kinetic energy) of the wheel rim 202 is imparted to the flywheel 113 where it is stored as rotational kinetic energy. It should be noted that, in the examples described herein, the wheel rim 202 and the flywheel 113 rotate in opposite directions.

The aforementioned example describes the operation of the energy recovery system 100 when the magnitude of the angular velocity of the wheel rim 202 is greater than the magnitude of the angular velocity of the flywheel 113. Under these conditions the kinetic energy of the rotating wheel is stored in the flywheel 113 of the energy recovery system 100 as mechanical potential energy. However, when the magnitude of the angular velocity of the flywheel 113 is greater than the magnitude of the angular velocity of the wheel rim 202 (and assuming that the tilt angle α between the roller elements 104 and the idler ring 126 is greater than $α_i$), the mechanical potential energy of the flywheel may be imparted to the wheel rim 202 thereby accelerating the wheel rim 202, as will be further described herein.

Still referring to FIGS. 1, 3 and 4, when the magnitude of the angular velocity of the flywheel 113 is greater than the magnitude of the angular velocity of the wheel rim 202 and the contact angle α between the roller elements 104 and the idler ring 126 is greater than $α_i$, the flywheel 113 rotates the third sun gear 148 of the third planetary gear set 112. In this example it is assumed that the flywheel 113 and the third sun gear 148 are rotated in a counter clockwise direction. The third sun gear 148 meshes with the pinion gears 154 located on the third carrier 150 and rotates the pinion gears 154 in a clockwise direction. Because the third ring gear 152 is fixed or grounded, rotation of the pinion gears 154 causes the third carrier 150 to rotate relative to the third ring gear 152 in a counter clockwise direction.

The counter clockwise rotation of the third carrier 150 is imparted to the second carrier 141 of the second planetary gear set 111 which is rotationally coupled to the third carrier 150. As the second carrier 141 rotates in a counter clockwise direction, the pinion gears 144 attached to the second carrier 141 mesh with the second ring gear 142 and the second sun gear 138 such that the pinion gears 144 rotate. As the magnitude of the angular velocity of the second sun gear 138 is generally greater than the magnitude of the angular velocity of the second ring gear 142, the rotation of the second carrier 141 causes the pinion gears 144 to rotate in a clockwise direction and the rotation of the second carrier 141 is imparted to the second sun gear 138 which causes the second sun gear 138 to rotate in the counter clockwise direction. The output ring 136 of the CVP 102 rotates with the second sun gear 138 in the counter clockwise direction which, in turn, rotates the roller elements 104 on the idler ring 126 in the counter clockwise direction. As the roller elements 104 rotate on the idler ring 126, the input ring 134 is also rotated in the counter clockwise direction which, in turn, rotates the first sun gear 118 in the counter clockwise direction.

As the first sun gear 118 meshes with the pinion gears 124 of the first planetary gear set 110 causing the pinions to rotate on the fixed first carrier 120 in the clockwise direction. The pinion gears 124, in turn, mesh with the first ring gear 122 causing the first ring gear 122 to rotate in the clockwise direction. The input/output coupling 132, which is fixedly attached to the first ring gear 122, rotates with the first ring gear 122 which, in turn, rotates the wheel rim 202 in the clockwise direction via the interconnection between the input/output coupling 132 and the wheel hub 232 thereby imparting the mechanical potential energy stored in the flywheel 113 to the wheel rim 202 and accelerating the wheel assembly 200.

As described herein, the energy recovery system 100 maybe used to store kinetic energy from a source of rotational motion coupled to the input/output coupling 132 and store that rotational motion in the flywheel 113 as mechanical potential energy (i.e., the rotation of the flywheel is the mechanical potential energy). The energy recovery system 100 stores the rotational energy from a source of rotational motion when the contact angle α is greater than a, and the magnitude of the angular velocity of the flywheel is less than the magnitude of the angular velocity of the input/output coupling 132 (i.e., the magnitude of the angular velocity of the source). Further, the energy recovery system 100 imparts rotational motion from the flywheel 113 to the source of rotational motion through the input/output coupling 132 when the contact angle α is greater than $α_i$ and the magnitude of the angular velocity of the flywheel is greater than the magnitude of the angular velocity of the input/output coupling 132.

Accordingly, it should now be understood that the energy recovery system 100 may be used both to accelerate a source of rotational motion to slow or brake a source of rotational motion. For example, the energy recovery system 100 may be coupled to a wheel for a vehicle, as described above and illustrated in FIGS. 1, 3 and 4. When the energy recovery system is configured to absorb or store the rotational motion of the wheel (i.e., when the tilt angle α is greater than $α_i$ and the magnitude of the angular velocity of the flywheel is less than the magnitude of the angular velocity of the wheel), the magnitude of the angular velocity of the wheel is decreased as the magnitude of the angular velocity of the flywheel increases due to conservation of energy thereby braking or slowing the wheel and the vehicle to which the wheel is coupled. Conversely, when the energy recovery system is configured to discharge or impart rotational motion from the flywheel to the wheel (i.e., when the tilt angle α is greater than $α_i$ and the magnitude of the angular velocity of the flywheel is greater than the magnitude of the angular velocity of the wheel), the magnitude of the angular velocity of the wheel increases as the angular velocity of the flywheel decreases thereby accelerating the wheel and the vehicle to which the wheel is attached. Methods for controlling an energy recovery system coupled to a vehicle wheel to facilitate accelerating and braking a vehicle, will be described in more detail herein.

Figure 6:
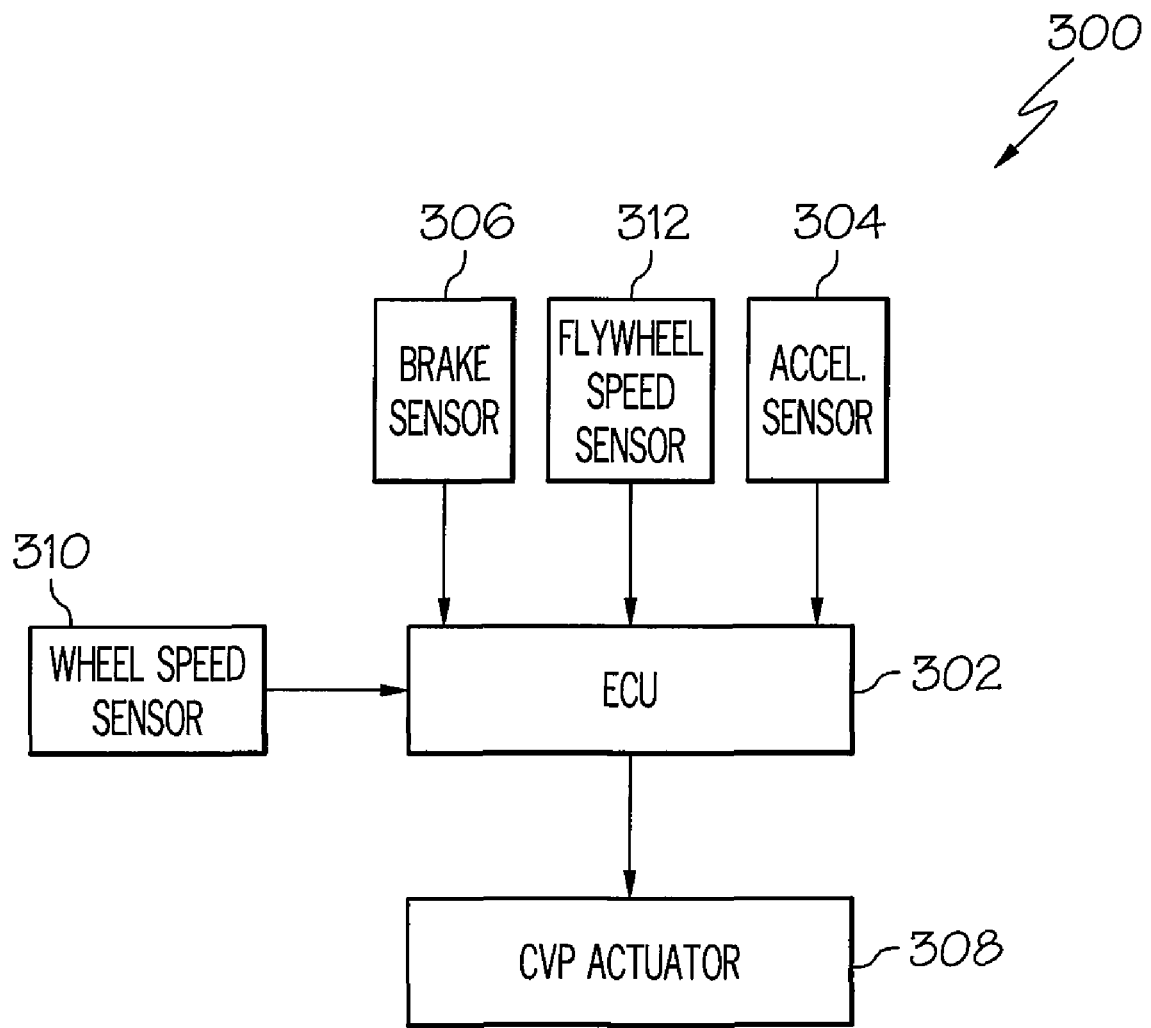
FIG. 6 is a schematic diagram of a control system for an energy recovery system according to one or more embodiments shown and described herein.

Referring now to FIGS. 3 and 5-6, the angular velocity of the flywheel 113 and the angular velocity of the input/output coupling 132 (and therefore the angular velocity or drive force imparted to the wheel assembly 200) may be controlled, at least in part, by adjusting the tilt angle $\alpha$ of the roller elements of the CVP 102. FIG. 5 shows the effect of adjusting the tilt angle $\alpha$ of the roller elements of the CVP 102 on the magnitude of the angular velocity of the flywheel 113. As shown in FIG. 5 and assuming the magnitude of the angular velocity of the flywheel is less than the magnitude of the angular velocity of the rim, increasing the tilt angle increases the magnitude of the angular velocity of the flywheel 113 for a given angular velocity of the wheel hub 232. Adjusting the tilt angle $\alpha$ has a similar effect on the angular velocity of the input/output coupling 132 when the magnitude of the angular velocity of the flywheel is greater than the magnitude of the angular velocity of the wheel rim. Accordingly, the speed of the flywheel 113 and the wheel assembly 200 may be controlled by adjusting the tilt angle $\alpha$ of the roller elements of the CVP 102.

Referring now to FIGS. 3 and 6, one embodiment of a control system 300 for use with the energy recovery system 100 is schematically depicted. The control system 300 generally comprises an electronic control unit (ECU) 302, a brake sensor 306, an accelerator sensor 304, an CVP actuator 308, a wheel speed sensor 310 and a flywheel speed sensor 312. The electronic control unit 302 may comprise a programmable logic controller or similar computer processor operable to execute a programmed or hardwired instruction set. The brake sensor, accelerator sensor and CVP actuator may be electrically coupled to the ECU and the ECU may be operable to receive electronic signals from each of the brake sensor and accelerator sensor and, based on the received signals, output a control signal to the CVP actuator.

The accelerator sensor 304 may be any suitable sensor coupled to the accelerator or throttle control system of a vehicle and operable to output a signal indicative of the amount of acceleration desired by the operator of the vehicle. For example, in one embodiment, where the vehicle is an automobile or truck, the accelerator sensor may be coupled to the accelerator of the vehicle and operable to determine the displacement of the accelerator as an indicator of the amount of acceleration desired by the vehicle operator. In another embodiment, the accelerator sensor may be operatively connected to the throttle of the vehicle and operable to determine the amount of acceleration desired by the driver based on the displacement of the throttle. Accordingly, it should be understood that the accelerator sensor 304 may generally output a signal to the ECU proportional to the amount of acceleration desired by the vehicle operator.

The brake sensor 306 may be any suitable sensor coupled to the brake system of a vehicle and operable to output a signal indicative of the amount of braking desired by the vehicle operator. For example, in one embodiment where the vehicle is an automobile or truck, the brake sensor may be coupled to the brake pedal of a vehicle and operable to determine the displacement of the brake pedal as an indicator of the amount of braking force desired by the vehicle operator. In another embodiment, the brake sensor may be positioned in the brake master cylinder and operable to determine the pressure of the fluid in the master cylinder as an indicator of the amount of braking force desired by the vehicle operator. Accordingly, it should be understood that the brake sensor 306 may generally output a signal to the ECU proportional to the amount of braking force desired by the vehicle operator.

The wheel speed sensor 310 may be operatively coupled to the wheel assembly 200 of the vehicle and may include any sensor, sensor system, or combination of sensors operable to determine the angular velocity of the wheel assembly 200. The wheel speed sensor may be operable to output a wheel speed signal to the ECU 302 which is indicative of the magnitude of the angular velocity of the wheel assembly 200.

Similarly, the flywheel speed sensor 312 may be any suitable sensor coupled to the flywheel of the energy recovery system and operable to output a signal indicative of the angular velocity of the flywheel. In the embodiments described herein, the flywheel speed sensor 312 is electrically coupled to the ECU 302 which is programmed to receive a signal indicative of the speed of the flywheel from the wheel velocity sensor 310 and, based on the signal, engage or disengage the CVP from the flywheel and rim.

The CVP actuator 308 may be a mechanical, electro-mechanical, pneumatic, or hydraulic actuator operatively coupled to the idler ring 126 of the CVP 102 of the energy recovery system 100. As described above, the idler ring 126 may be displaced in an axial direction such that the tilt angle $\alpha$ of the roller elements 104 of the CVP 102 are adjusted relative to the idler ring 126. The CVP actuator 308 may be coupled to the idler ring 126 and operable to displace the idler ring 126 in an axial direction based on control signals received from the ECU 302.

The use of the control system 300 to control the energy recovery system 100 positioned in the wheel assembly 200 will now be described with specific reference to FIGS. 3 and 6. When the vehicle is at rest, the control system 300 may be programmed to disengage the energy recovery system 100 from the wheel assembly 200 and the wheel rim 202 by sending a control signal to the CVP actuator 308 which causes the CVP actuator 308 to displace the idler ring 126 of the CVP 102 such that the tilt angle $\alpha$ is at an angle $\alpha_i$. When $\alpha=\alpha_i$ the CVP is in neutral and no rotation is imparted to or discharged from the flywheel 113. The control system 300 may be operable to determine when the vehicle is at rest with the wheel speed sensor 310.

When the vehicle is accelerating from a stop, the ECU 302 receives an electronic signal from the accelerator sensor 304 indicative of the amount of acceleration desired by the vehicle operator. When the velocity of the flywheel is greater than the velocity of the wheel (as determined with the flywheel speed sensor 312 and the wheel speed sensor 310), the ECU 302 may be programmed to send a control signal to the CVP actuator 308 which displaces the idler ring 126 in an axial direction such that the tilt angle $\alpha$ of the roller elements 104 increases from $\alpha_i$. The amount which the idler ring 126 is displaced (and therefore the tilt angle $\alpha$) is directly proportional to the amount of acceleration desired by the vehicle operator as indicated by the electronic signal received from the accelerator sensor 304. In this mode of operation, when the magnitude of the angular velocity of the flywheel 113 is greater than the magnitude of the angular velocity of the wheel rim 202, the mechanical kinetic energy stored in the flywheel is imparted to the wheel rim as described herein thereby accelerating both the wheel and the vehicle. As the amount of acceleration desired by the vehicle operator changes (e.g., increases or decreases) as determined with the accelerator sensor 304, the ECU 302 may be programmed to send a control signal to the CVP actuator 308 which adjusts the axial displacement of the idler ring 126 and, as such, the tilt angle $\alpha$ of the roller elements 104 of the CVP 102. As described hereinabove, when the magnitude of the angular velocity of the flywheel is greater than the magnitude of the angular velocity of the wheel, increasing the tilt angle $\alpha$ from $\alpha_i$ increases the amount of rotational energy imparted to the wheel assembly 200 of the vehicle. Accordingly as the tilt angle α increases, the angular velocity of the wheel rim 202 increases, thus accelerating the vehicle.

After the mechanical potential energy of the flywheel 113 is discharged to the wheel rim following the initial acceleration of the vehicle from a stop, the ECU 302 may be programmed to send a control signal to the CVP actuator 308 causing the CVP actuator 308 to place the CVP 102 in neutral. For example, the velocity of the flywheel may be determined with the flywheel speed sensor which provides the ECU 302 with a signal indicative of the angular velocity of the flywheel. When the angular velocity of the flywheel is zero, the ECU 302 disengages the CVP from the flywheel and the rim, as described above.

Similarly, when the vehicle is in motion and the operator desires to slow or brake the vehicle, the ECU 302 receives a signal from the brake sensor 306 indicative of the amount of braking desired by the vehicle operator. When the angular velocity of the flywheel is less than the angular velocity of the wheel (as determined with the wheel speed sensor 310 and the flywheel speed sensor 312), the ECU 302 may be programmed to output a control signal to the CVP actuator 308 which axially displaces the idler ring 126. The amount which the CVP actuator 308 displaces the idler ring 126 (and therefore the resulting tilt angle α) is directly proportional to the amount of braking desired by the vehicle operator as indicated by the electronic signal received from the brake sensor. In this mode of operation, when the magnitude of the angular velocity of the flywheel 113 is less than the magnitude of the angular velocity of the wheel rim 202, the rotational motion of the wheel assembly 200 is imparted to the flywheel 113. As the kinetic energy of the wheel is imparted to the flywheel, the rotation of the wheel is slowed thereby braking the wheel and the vehicle to which the wheel is attached. As the amount of braking desired by the driver changes (e.g., increases or decreases) as determined by the brake sensor 306, the ECU 302 may be programmed to send a control signal to the CVP actuator 308 which adjusts the axial displacement of the idler ring 126 and, as such, the tilt angle α of the roller elements 104 on the idler ring 126. As described hereinabove, adjusting the tilt angle α adjusts the speed of rotation of the flywheel 113 and the amount of rotational energy absorbed by the flywheel 113. Accordingly, as the tilt angle α increases from $α_i$, the angular velocity of the flywheel increases and the speed of the vehicle decreases thus providing more braking assist to the vehicle.

It should now be understood that the embodiments of the energy recovery system described herein may be used in conjunction with the wheel of a vehicle to provide the wheel with braking or supplement the acceleration of the wheel. For example, in one embodiment a front wheel drive vehicle may use a conventional braking system on the front wheels of the vehicle while each of the rear wheels of the vehicle comprise an energy recovery system as described herein. In an alternative embodiment, at least one of the wheels of a vehicle may comprise an energy recovery system as described herein while the remaining wheels of the vehicle utilize conventional braking systems.

One advantage of the energy recovery systems described herein is the relatively high conversion efficiency of CVP. It is believed that the roller type CVP described herein generally has an efficiency of greater than about 85% when converting rotational kinetic energy to mechanical potential energy or converting mechanical potential energy to rotational kinetic energy. When the CVP is utilized in the energy recovery systems described herein, it is believed that the overall efficiency of the energy recovery system exceeds 60%.

While specific examples described herein are directed to the use of the energy recovery system in conjunction with a vehicle wheel, it is contemplated that the energy recovery system may be used in conjunction with other sources of rotational motion to achieve the same vehicle braking and accelerating functions. For example, the input of the energy recovery system may be directly coupled to the output shaft of a vehicle engine while the output of the energy recovery system may be coupled to the driveline thereby providing both engine braking as well providing acceleration assist to the driveline. Accordingly, it should be understood that the energy recovery system may be used in various other applications in which the recovery, storage and re-distribution of rotational kinetic energy may be desirable.

Further, it should also be understood that the energy recovery systems described herein may be used in conjunction with various wheeled vehicles including, without limitation, automobiles, trucks, trains, motorcycles, bicycles and the like, irrespective of the motive force which is used to propel the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wheel assembly for a vehicle comprising a rim and an energy recovery system, the energy recovery system comprising a flywheel, a continuously variable planetary (CVP), a first planetary gear set, and a second planetary gear set, wherein:
   the flywheel is substantially concentric with the rim and operable to rotate relative to the rim;
   the CVP is positioned within the flywheel and is operable to transmit rotational motion between the flywheel and the rim;
   the first planetary gear set is disposed in the flywheel and rotationally coupled to the rim and the CVP such that rotational motion transmitted between the CVP and the rim is transmitted through the first planetary gear set;
   the second planetary gear set is disposed in the flywheel and rotationally coupled to the CVP, the rim and the flywheel such that rotational motion transmitted between the CVP, the rim and the flywheel is transmitted through the second planetary gear set, wherein:
      when a magnitude of an angular velocity of the rim is greater than a magnitude of an angular velocity of the flywheel, kinetic energy from the rim is imparted to the flywheel and stored as mechanical potential energy; and
      when the magnitude of the angular velocity of the rim is less than the magnitude of the angular velocity of the flywheel, mechanical potential energy stored in the flywheel is imparted to the rim thereby accelerating the rim.

2. The wheel assembly of claim 1 wherein the CVP comprises an idler ring, a plurality of roller elements, an input ring and an output ring, wherein:
   the idler ring is concentric with the flywheel and operable to rotate about an axis of rotation of the wheel assembly;
   the plurality of roller elements are pivotally positioned on the idler ring and operable to roll on the idler ring, wherein the idler ring is axially displaceable with respect to the roller elements such that a tilt angle between the roller elements and the idler ring is adjustable;

the input ring is frictionally engaged with the roller elements and rotationally coupled to the first planetary gear set such that the input ring is operable to transmit rotational motion between the first planetary gear set and the roller elements; and the output ring is frictionally engaged with the roller elements and rotationally coupled to the second planetary gear set such that the output ring is operable to transmit rotational motion between the second planetary gear set and the roller elements.

3. The wheel assembly of claim 2 wherein the roller elements are spherical.

4. The wheel assembly of claim 2 wherein the roller elements are spheroidal.

5. The wheel assembly of claim 1 further comprising a third planetary gear set which rotationally couples the second planetary gear set and the flywheel.

6. The wheel assembly of claim 5 wherein the third planetary gear set comprises a ring gear, a carrier concentric with the ring gear, a sun gear concentric with the carrier, and a plurality of pinion gears rotatably attached to the carrier and engaged with the ring gear and the sun gear, wherein:
the ring gear of the third planetary gear set is fixed to a housing of the energy recovery system;
the carrier of the third planetary gear set is rotationally coupled to the carrier of the second planetary gear set; and
a sun gear of the third planetary gear set is rotationally coupled to the flywheel.

7. The wheel assembly of claim 1 further comprising an input/output coupling that couples the rim to both the first planetary gear set and the second planetary gear set.

8. The wheel assembly of claim 1 wherein the first planetary gear set comprises a ring gear, a carrier concentric with the ring gear, a sun gear concentric with the carrier, and a plurality of pinion gears rotatably attached to the carrier and engaged with the ring gear and the sun gear, wherein:
the carrier of the first planetary gear set is fixed to a housing of the energy recovery system;
the ring gear of the first planetary gear set is rotationally coupled to the rim; and
the sun gear of the first planetary gear set is rotationally coupled to the CVP such that the first planetary gear set rotationally couples the CVP to the rim.

9. The wheel assembly of claim 1 wherein the second planetary gear set comprises a ring gear, a carrier concentric with the ring gear, a sun gear concentric with the carrier, and a plurality of pinion gears rotatably attached to the carrier and engaged with the ring gear and the sun gear, wherein:
the sun gear of the second planetary gear set is rotationally coupled to the CVP;
the carrier of the second planetary gear set is rotationally coupled to the flywheel; and
the ring gear of the second planetary gear set is rotationally coupled to the rim such that the second planetary gear set rotationally couples the CVP and the rim to the flywheel.

10. An energy recovery system comprising a flywheel, a continuously variable planetary (CVP), a first planetary gear set, a second planetary gear set, and an input/output coupling configured for connection to a source of rotational motion, wherein:
the first planetary gear set rotationally couples the CVP to the input/output coupling;
the second planetary gear set rotationally couples the CVP to the flywheel and the input/output coupling to the flywheel; and
the CVP is operable to transmit rotational motion between the flywheel and the input/output coupling, the CVP comprising an idler ring, a plurality of roller elements, an input ring and an output ring, wherein:
the idler ring is concentric with the flywheel and operable to rotate about an axis of rotation of energy recovery system;
the plurality of roller elements are pivotally positioned on the idler ring and operable to roll on the idler ring, wherein the idler ring is axially displaceable with respect to the roller elements such that a tilt angle between the roller elements and the idler ring is adjustable;
the input ring is frictionally engaged with the roller elements and rotationally coupled to the first planetary gear set such that the input ring is operable to transmit rotational motion between the first planetary gear set and the roller elements; and
the output ring is frictionally engaged with the roller elements and rotationally coupled to the second planetary gear set such that the output ring is operable to transmit rotational motion between the second planetary gear set and the roller elements.

11. The energy recovery system of claim 10 wherein, when a magnitude of an angular velocity of the input/output coupling is greater than a magnitude of an angular velocity of the flywheel, kinetic energy from the input/output coupling is imparted to the flywheel and stored as mechanical potential energy.

12. The energy recovery system of claim 10 wherein, when a magnitude of an angular velocity of the input/output coupling is less than a magnitude of an angular velocity of the flywheel, mechanical potential energy stored in the flywheel is imparted to the input/output coupling thereby accelerating the input/output coupling.

13. The energy recovery system of claim 10 wherein the roller elements are spherical.

14. The energy recovery system of claim 10 wherein the roller elements are spheroidal.

15. The energy recovery system of claim 10 further comprising a third planetary gear set having a ring gear, a carrier concentric with the ring gear, a sun gear concentric with the carrier, and a plurality of pinion gears rotatably attached to the carrier and engaged with the ring gear and the sun gear, wherein:
the ring gear of the third planetary gear set is fixed to a housing of the energy recovery system;
the carrier of the third planetary gear set is rotationally coupled to the carrier of the second planetary gear set; and
a sun gear of the third planetary gear set is rotationally coupled to the flywheel.

16. The energy recovery system of claim 10 wherein the first planetary gear set comprises a ring gear, a carrier concentric with the ring gear, a sun gear concentric with the carrier, and a plurality of pinion gears rotatably attached to the carrier and engaged with the ring gear and the sun gear, wherein:
the carrier of the first planetary gear set is fixed to a housing of the energy recovery system;
the ring gear of the first planetary gear set is rotationally coupled to the input/output coupling; and the sun gear of the first planetary gear set is rotationally coupled to the input ring of the CVP such that the first planetary gear set rotationally couples the CVP to the input/output coupling.

17. The energy recovery system of claim 10 wherein the second planetary gear set comprises a ring gear, a carrier concentric with the ring gear, a sun gear concentric with the carrier, and a plurality of pinion gears rotatably attached to the carrier and engaged with the ring gear and the sun gear, wherein:

the sun gear of the second planetary gear set is rotationally coupled to the output ring of the CVP;

the carrier of the second planetary gear set is rotationally coupled to the flywheel; and the ring gear of the second planetary gear set is rotationally coupled to the input/output coupling such that the second planetary gear set rotationally couples the CVP and the input/output coupling to the flywheel.

18. A method for controlling a vehicle having a wheel assembly as described in claim 2, the method comprising:

determining an amount of braking force applied to the vehicle;

determining an acceleration of the vehicle; and adjusting the tilt angle of the roller elements of the CVP on the idler ring of the CVP in proportion to the amount of braking force or the acceleration.

19. The method of claim 18 further comprising:

determining an angular velocity of the rim; and adjusting the tilt angle of the roller elements such that rotational motion is neither imparted to nor discharged from the energy recovery system when the angular velocity of the rim is zero.

20. The method of claim 18 wherein the tilt angle of the roller elements of the CVP is adjusted by axially displacing the idler ring of the CVP relative to the roller elements.

* * * * *